(No Model.)
R. M. BRUNDIGE.
Dust and Wind Guard for Windows.
No. 237,075.          Patented Jan. 25, 1881.
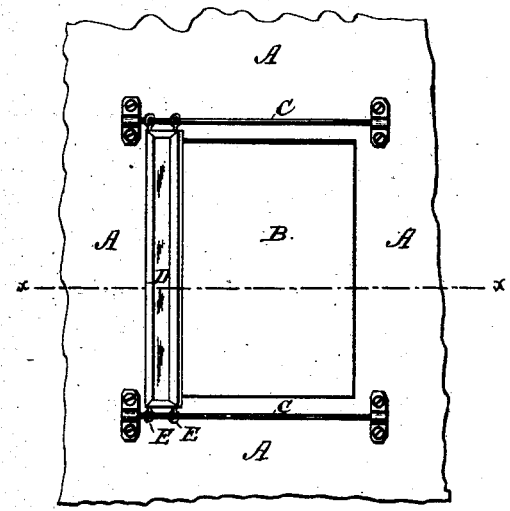
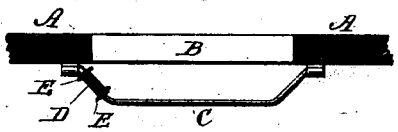
WITNESSES:
INVENTOR:
ATTORNEYS.

United States Patent Office.

RUFUS M. BRUNDIGE, OF NEW YORK, N. Y.

DUST AND WIND GUARD FOR WINDOWS.

SPECIFICATION forming part of Letters Patent No. 237,075, dated January 25, 1881.

Application filed May 27, 1880. (No model.)

*To all whom it may concern:*

Be it known that I, RUFUS M. BRUNDIGE, of the city, county, and State of New York, have invented a new and useful Improvement in Dust and Wind Guards for Windows, of which the following is a specification.

Figure 1 is front elevation of the improvement. Fig. 2 is a sectional plan view taken through the line $x\ x$, Fig. 1.

Similar letters of reference indicate corresponding parts.

The object of this invention is to furnish guards to prevent dust and wind from entering the windows of cars and other vehicles, vessels, and houses and other buildings, so constructed that it may be adjusted as the direction of the object to which it is attached or of the wind may change.

The invention consists in constructing a dust and wind guard for a window of a plate having eyes at its ends and bent rods for supporting the plate, whereby the plate can be adjusted at either side of the window, as will be hereinafter fully described.

I will describe the improvement as applied to a car; but do not limit myself to that use.

A represents the side wall of a car, and B represents the car-window.

To the side wall, A, of the car above and below the window B are attached the ends of two rods or bars, C, the end parts of which are inclined, and their middle parts are parallel with the window; or, if desired, the rods may have a continuous curve from end to end.

D is a plate, which may be a glass plate set in a frame, or a plate of wood, metal, or other suitable material.

To the ends of the plate D are attached eyes E, which may be rigid or swiveled, or may be formed in the end parts of the plate D. The rods C pass through the eyes E, so that the plate D can be slid upon the rods C from one side of the window to the other as the direction of the car or of the wind may be changed. With this construction, dust, cinders, and wind will strike the inclined plate D and be deflected outward, so as to pass the window.

Having thus described my invention, I claim as new and desire to secure by Letters Patent—

A dust and wind guard for a window, constructed substantially as herein shown and described, consisting of a plate, D, having eyes E at its ends, and the bent supporting-rods C, substantially as herein shown and described.

RUFUS M. BRUNDIGE.

Witnesses:
JAMES T. GRAHAM,
C. SEDGWICK.